May 19, 1970     A. LEGRIS     3,512,553

INTEGRATED CIRCUIT FLUID PROGRAMMER

Filed Oct. 16, 1967     9 Sheets-Sheet 1

May 19, 1970  A. LEGRIS  3,512,553
INTEGRATED CIRCUIT FLUID PROGRAMMER
Filed Oct. 16, 1967  9 Sheets-Sheet 3

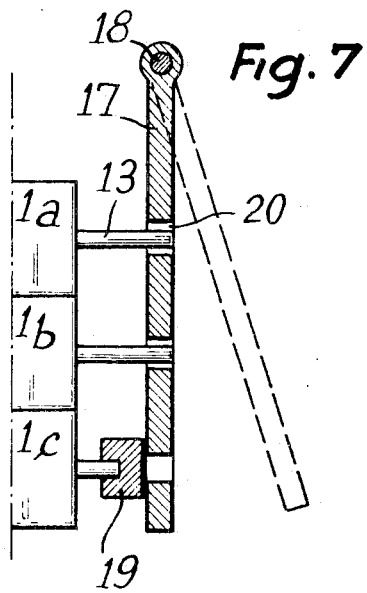
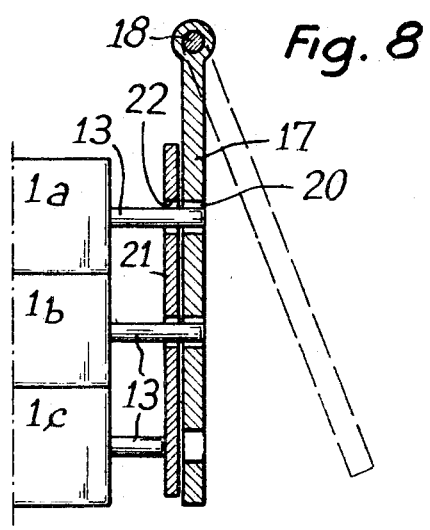
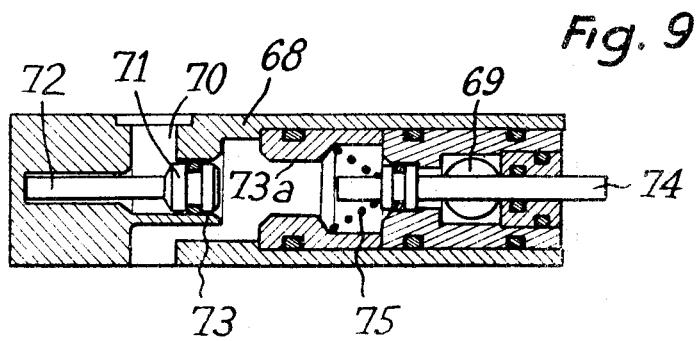
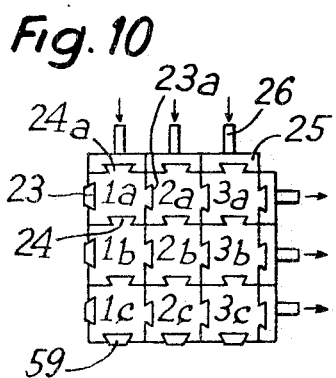
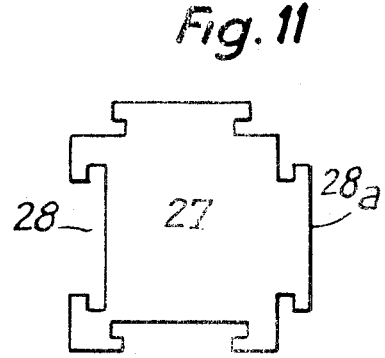

May 19, 1970  A. LEGRIS  3,512,553
INTEGRATED CIRCUIT FLUID PROGRAMMER
Filed Oct. 16, 1967  9 Sheets-Sheet 6

May 19, 1970        A. LEGRIS        3,512,553

INTEGRATED CIRCUIT FLUID PROGRAMMER

Filed Oct. 16, 1967        9 Sheets-Sheet 9

3,512,553
INTEGRATED CIRCUIT FLUID PROGRAMMER
André Legris, Saint Maur-des-Fosses, France, assignor to Society Legris & Fils
Filed Oct. 16, 1967, Ser. No. 675,610
Claims priority, application France, Apr. 3, 1967, 101,284; Aug. 1, 1967, 116,453
Int. Cl. F16k 31/44
U.S. Cl. 137—635
19 Claims

ABSTRACT OF THE DISCLOSURE

An integrated circuit fluid programmer for controlling the flow of pressurized fluid from sequence lines to power lines, comprising an assembly block containing distinct series of sequence and power conduits having sequence inputs and power output openings; orientation means for placing the sequence and power conduits in communication to enable fluid to flow from the sequence inputs towards the power outputs; and programming means for actuating certain of the orientation means.

---

Fluid control devices are, in certain cases, rapidly replacing previously used electrically or electronically controlled devices.

These fluid control devices provide for consistent automatic results and allow the electrically operated pilot valves of fluid power assemblies to be eliminated.

Moreover, because of their means of actuation, these fluid control devices can be used without danger in an explosive atmosphere and there is no risk of electrocution to personnel.

Finally, fluid operated control devices are simple to keep in operation and require far less upkeep than corresponding electrical or electronic apparatus. Furthermore, because they are always under pressure there is no chance of entry thereinto of dirt or impurities.

The fluid programmer according to the invention is intended to ensure that the sequences distributed by a step-by-step advancing device correspond to the movements to be controlled. This programming device comprises cells disposed at the intersections of the lines corresponding to the movements to be controlled with the columns corresponding to the sequences.

These cells enable intercommunications of the sequences in a direction towards the required movements to be ensured and prevent communications of the movement in a direction towards the sequences.

Cells are used which are assembled so as to form a programming block assembly which has no outside connecting conduit between the cells, all the conduits being integrated into the assembly thus constituted.

Furthermore, this embodiment allows the cells to be interchanged in the case of a breakdown, since they are identical. The cells are controlled from outside by pushrods which cooperate with the programming means, which preferably compirses a punched card.

The cell according to the invention, which has thrust valves, enables a programmer of very reduced volume to be obtained, which is almost impossible with ordinary valves, balls or slide valves.

The inner shapes, the mounting, the fixing of the lateral sealing rings enable a cell to be obtained which has a reduced diameter, but relatively large passages with respect to the cross-section of the cell. This results in an economic assembly which is less expensive than corresponding electrical apparatus.

In accordance with the present invention, the programmer comprises in combination an assembly block having two distinct series of sequence and power carrying conduits having respectively sequence inputs and power outputs, orientation means adapted to place the sequence and power conduits in unilateral commnuication and programming means for actuating the orietation means.

However, it is also possible to envisage other embodiments of the assembly, principally using plates or blocks in which the sequence and power conduits are formed, and housings for obturating elements and pushrods.

In another embodiment, the panel has series of cavities in which are mounted programming elements constituted in the same way as the cells described above.

The main advantage of these embodiments over the stacked cell devices, is that they have strict distances between the elements obtained by manufacture in the blocks or plates and that there is exact correspondence between the pushrods and the programming means.

Furthermore, when the programmers are used on special machines, the cycles of which are precise and determined, there often exist cell areas which are always unused and whose role consists solely in letting the fluid through, whilst nevertheless causing a loss of charge.

There is provided by the invention a very simple filling cell, comprising only two separate conduits corresponding to the lines of sequence and of power. These filling cells, which are less expensive, also have the advantage of providing much more rapid responses to the programmer in the unused areas, while ensuring a direct passage without loss of fluid power.

In the panel containing the cavities, filling elements are movably mounted, which elements may be replaced in accordance with a predetermined program by a small number of programming elements, the inner plan of which is identical with that described above.

However, in this case, the programming element may be considerably simplified and have only a free obturating element, the push rod no longer being necessary. The programming means may comprise a punched card which enables the points where it is suitable to replace the filling element by a programming element to be determined without difficulty.

However, it is also possible to carry out the programming without a punched card, the programming elements being engaged in numbered cavities according to a determined program.

This combination provides a less expensive programmer for the purposes defined above.

The element disposed in its cavity may be either balanced under pressure and self-maintained in its cavity by means of ring joints, or non-balanced under pressure with a retaining plate mounted after programming ensuring the holding of the programmed elements, the filling elements always being balanced under pressure and thus without fluid thrust.

This type of programmer has the advantage of allowing the immediate changing of a defective element and it is particularly adapted for hydraulic programming, where it is necessary to use a strong assembly which will not lose its shape and which is balanced under pressure.

Other characteristics and advantages of the present invention will be shown in the description which follows, by way of example, of various embodiments in accordance with the invention, with reference to the accompanying drawings, in which:

FIG. 7 is a side view of an embodiment of the programming means comprising a perforated cover and caps mounted on the pushrods.

FIG. 8 is a side view of an embodiment in which programming is effected by punched card.

FIG. 9 is a view in cross-section of another embodiment of the cell.

FIG. 10 is a view showing how the cells are assembled.

FIG. 11 is a view of another arrangement of the cells.

The programming device according to the invention shown in FIGS. 1, 2, 3 and 4 comprises a series of cells marked 1a, 1b, 1c, 2a, 2b, 2c, 3a, 3b, 3c in the example shown, constituting a panel which has in a rearwardly situated plane an assembly of vertical sequence conduits 1, 2, 3 and in a separate forwardly situated plane an assembly of horizontal power conduits a, b, c.

Communication means are provided between the sequence conduits 1, 2, 3 and the power conduits a, b, c, to enable the sequence conduits to be selectively put into communication with the power conduits, but only in the direction of the sequence conduits towards the power conduits.

Figure 2:
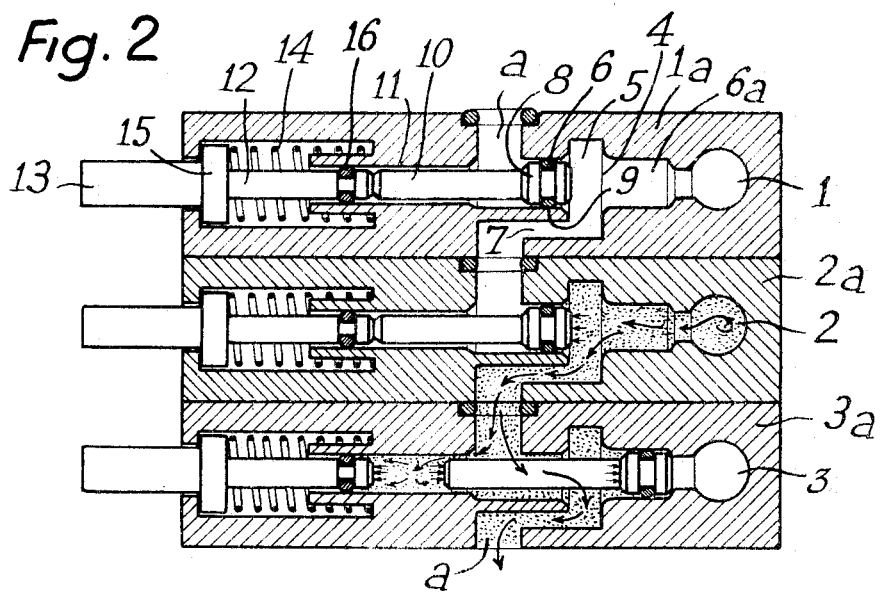
FIG. 2 is a view in cross-section along the line II—II of FIG. 1.
Figure 3:
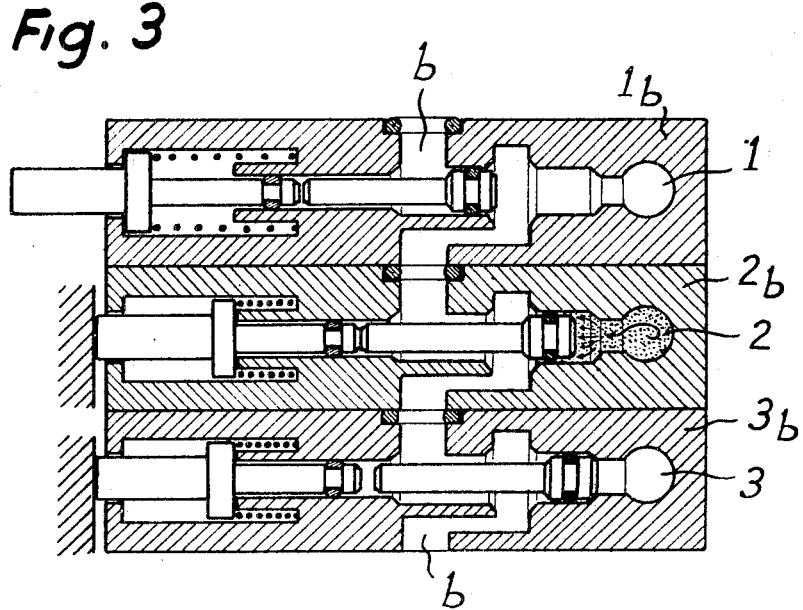
FIG. 3 is a view in cross-section along the line III—III of FIG. 1.
Figure 4:
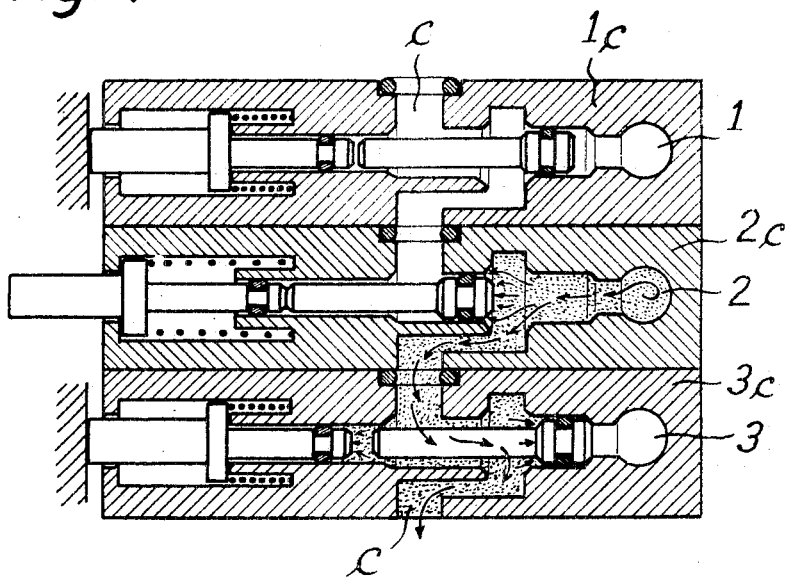
FIG. 4 is a view in cross-section along the line IV—IV of FIG. 1.

The sequence conduits 1, 2, 3 are supplied with fluid under pressure one after the other by a step-by-step device and an orientation means, which will be described later, allows the power lines to be fed according to a predetermined program. As shown in FIG. 2 each cell contains an inner conduit 4 connecting principally, in the case of the cell 1a, the sequence conduit 1 and the power conduit a, the said conduit 4 comprising a central chamber 5 and two cylindrical seats 6, 6a, the central chamber 5 being in communication with the power conduit a of the next cell 2a by means of a transfer duct 7.

A valve 8 is freely and slidably mounted inside the conduit 4, which valve is provided with a joint 9 constituted by a ring and extended by a guiding rod 10 engaged in a bore 11 of the cell. The width of the useful part of the valve 8 is about the same as the distance separating the two cylindrical seats 6, 6a. This enables the valve 8 to pass rapidly from one seat to the other without leaving its guiding rod. The cylindrical portions of the valve on each side of the ring 9 permit fluid pressure to accelerate the valve onto the seats at the time of a lateral movement.

In its sliding movement the valve 8 is capable of occupying two positions in which it is engaged in one or the other of the cylindrical seats 6, 6a of the connection conduit 4.

By means of its rod 10 the valve 8 is capable of being actuated by a pushrod 12 forming an extension of the rod 10 and slidably mounted in the bore 11, the said pushrod having an end 13 which extends outside the cell under the action of a resilient element 14, a stop 15 limits the movement of the said pushrod inside the cell. A sealing ring 16 is mounted on the end of the pushrod 12 engaged in the bore 11.

When the pushrod 12 is pushed (FIG. 5) against the action of the resilient element 14 the valve 8 is engaged in the cylindrical seat 6a, isolating the sequence conduit 1 from the power conduit a. If, on the contrary, the pushrod 12 is pulled by the action of the resilient element 14, the valve 8 is free to be engaged in the cylindrical seat 6 or 6a according to the fluid action from the sequence conduit 1 acting on the valve 8.

An example of the operation of the programming device has been shown in FIGS. 1 to 4.

The pushrods 12 of the cells (1a, 1b, 2a, 2c and 3a) are in pulled-out position and therefore functioning, whereas the pushrods of the cells 1c, 2b, 3b, 3c are in the pushed-in position and therefore out of operation. This disposition of the pushrods corresponds to a predetermined program obtained by means to be described later and, in order to provide a predetermined supply to the power lines.

After having been supplied with fluid, the sequence conduit 1 is vented to the atmosphere, the cells 1a, 1b are in operation without pressure, the valve 8 being pushed back by the supply at the time of the first sequence and is now at rest.

The cell 1c is out of operation without pressure, the valve 8 being in the cylindrical seat 6a and closing the passage between the sequence conduit 1 and the power conduit c.

The sequence and power conduits of the cells 1a, 1b, 1c are connected to the atmosphere.

As shown in FIG. 2 the sequence conduit 2 is in a feeding phase. The cell 2a is operating, the pushrod 12 being in its withdrawn position, and the valve 8 being engaged, under the action of the fluid, in the cylindrical seat 6, where it prevents the flow of fluid towards the cell 1a but permits flow from conduit 2 towards the power conduit a of the cell 3a through transfer duct 7. Since the cell 3a is in its operative position (the pushrod withdrawn) and the sequence conduit 3 is open to the atmosphere, the valve 8 is in the cylindrical seat 6a where it interrupts the connection between the sequence conduit 3 and the power conduit a, but allows passage of fluid coming from the cell 2a by the cylindrical seat 6, the chamber 5 and the transfer duct 7 of the cell 3a. In this way, the power conduit a is fed by the sequence conduit 2 to control a movement at its exit.

Referring now to the power conduit b (FIG. 3), the cell 2b is in its blocking position (the pushrod is pushed in) and the valve 8 is engaged in the cylindrical seat 6a where it closes the passage between the sequence conduit 2 which is fed and the power conduit b. The cell 3b is also in its blocking position, the valve 8 being engaged in the seat 6a to close the passage between the sequence conduit 3 and the power conduit b. The sequence conduit 2 which is fed is isolated from the power conduit b and the exit of the power conduit b is thus not fed.

In the power conduit c (FIG. 4), the cell 2c is operative (the pushrod is retracted), the sequence conduit 2 being fed, the valve 8 is pushed by the fluid into the cylindrical seat 6 where it prevents the passage of fluid towards the cell 1c but allows fluid to flow towards the cell 3c through transfer duct 7. The cell 3c is in blocking position, since the valve 8 is engaged in the seat 6a where it blocks the connection between the sequence conduit 3 and the atmosphere and the power conduit c, but permits the passage of fluid coming from the cell 2c by the cylindrical seat 6, the chamber 5 and the transfer duct 7 of the cell 3c. In this manner, the power conduit c is fed by the sequence conduit 2 to control a movement at its exit.

The following table shows the normal condition of the cells for the program of FIGS. 1 to 4:

and a rib 24a. It is thus possible to assemble the cells by engaging the ribs in the grooves.

The sequence inputs and the power outputs are provided with branching elements 25 each having a groove of dove-tailed section which is engaged over a corresponding rib 24a or 23a of a cell. These branching elements have connections 26 to which are attached conduits for entry or exit fluid.

In FIG. 11 there is shown a cell 27 on which the ribs 28a and the grooves 28 are of rectangular section. It will be clear that any other section of ribs and grooves can be used. The production of cell assemblies in semi-rigid plastic or any other similar material enables the assembly to be formed with a certain friction between the

| Cells | Push-rods | Valves | Sequence | Conduit |
|---|---|---|---|---|
| 1a, 1b | Operative, no pressure. | Closed conduit pressure. | To the atmosphere. | To the atmosphere. |
| 2a, 2c | Operative urged by valve. | Closed conduit under pressure. | Under pressure. | Fed under pressure. |
| 3a | Operative urged by pressure. | Close sequence under pressure by conduit. | To the atmosphere. | Fed under pressure. |
| 2b | Blocking urged by valve. | Close sequence urged under pressure. | Under pressure. | To the atmosphere. |
| 3b | Blocking no pressure. | Close sequence at the lowest without pressure. | To the atmosphere. | To the atmosphere. |
| 1c | Blocking no pressure. | Close sequence at the highest without pressure. | To the atmosphere. | To the atmosphere. |
| 3c | Blocking pushed under pressure. | Close sequence urged under pressure. | To the atmosphere. | Fed under pressure. |

FIG. 7 shows a programming means comprising a perforated plate 17 disposed opposite the ends 13 of pushrods 12 and pivoted about an axis 18. During the establishment of a predetermined program, the ends 13 of some of the pushrods 12 are provided with caps 19. In the case of FIG. 7 the pushrods 12 of the cells 1a and 1b do not have caps, only the pushrod of cell 1c being provided with a cap, so that when the plate 17 is pivoted about its axis 18 and brought to the position shown in full lines, the desired program is instantaneously effected.

In other words, the ends 13 of the pushrods corresponding to cells 1a and 1b engage in the holes 20 in the plate and the end 13 of the pushrod corresponding to the cell 1c which is provided with a cap 19 is pushed back. Consequently the cells 1a and 1b are in the operative position and the cell 1c is in the blocking position.

A further embodiment of programming means is shown in FIG. 8 and also comprises a perforated plate 17 pivoted about an axis 18 but in this case a perforated card 21 is used formed according to the desired program, which card is held against the plate 17 between the latter and the ends 13 of the pushrods 12. The card has perforations 22 in order to enable the pushrod corresponding to cells 1a, 1b which are operative to pass therethrough.

At the points where the card 21 has no perforations, the end 13 of the pushrod corresponding to the cell 1c is pushed back when the plate 17 is pivoted and the cell 1c is thus brought into its closing position. The cell should be suitable for normal use and the effort on the pushrod should be the smallest possible since the addition of the forces required for groups of multiple cells produces a very considerable total force which wil deform any support for the perforated programming plate. The small diameter of the sealed ring of the control pushrod or the balancing of the efforts by a calibrated spring contributes to this result.

It is also possible to provide a programming without perforated cards by disposing plastic buttons in the perforated plate 17 in place of the caps on the pushrods.

Figure 1:
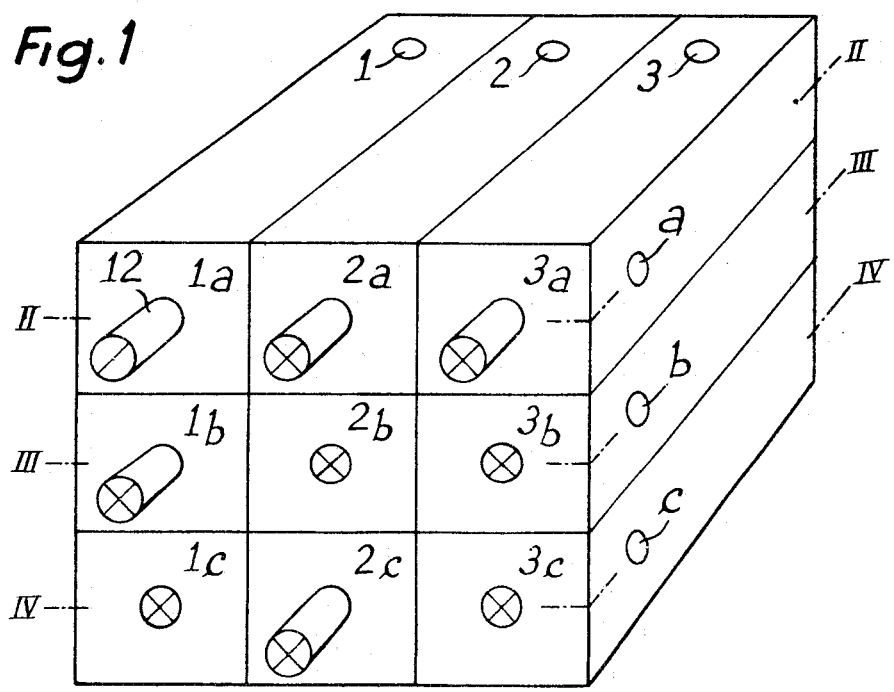
FIG. 1 is a view in perspective of the programming device according to the invention.

In FIG. 1 there is shown an assembly constituted by cells 1a, 1b, 1c; 2a, 2b, 2c; 3a, 3b, 3c; in order to obtain such an assembly however it is necessary to provide assembly means of which an embodiment is shown in FIG. 10, in this arrangement grooves and ribs of dove-tailed section are shown. Each cell such as 1a has on two opposite faces respectively a groove 23 and a rib 23a and on its other opposite faces respectively a groove 24 individual cells thus providing better sealing and better resistance to vibrations to which the assembly may be subjected.

Figure 12:
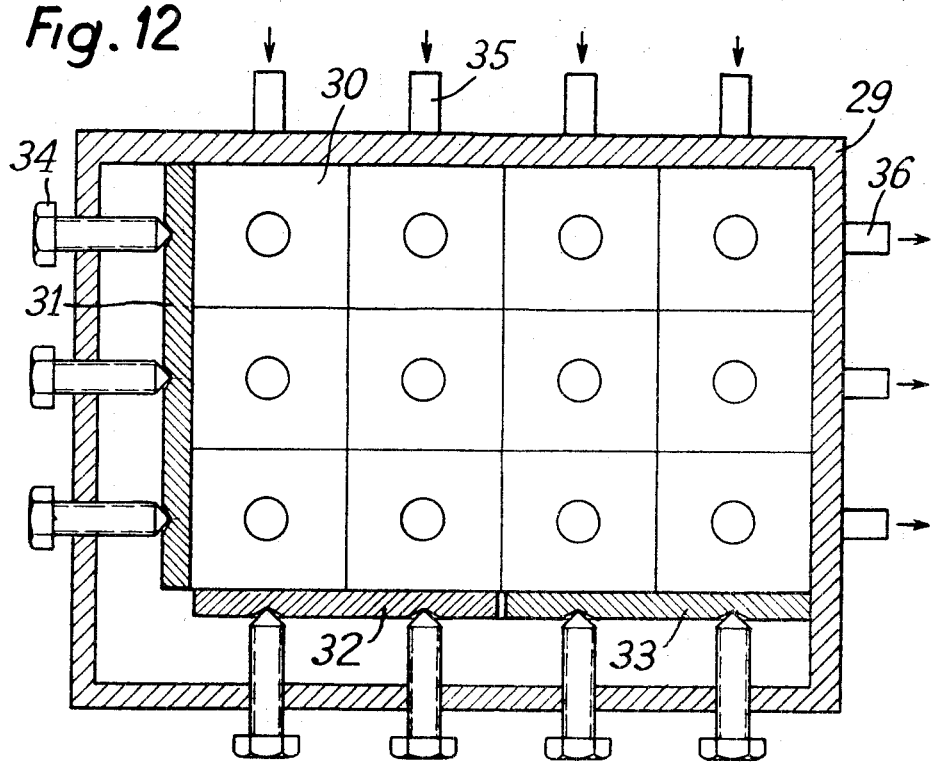
FIG. 12 is a view showing yet another arrangement of cells.

In another embodiment shown in FIG. 12 a frame 29 is used at the interior of which are assembled cells 30 identical to those 1a and 3c of FIG. 1, these cells being gripped one against the other on two contiguous faces of the frame by clamping plates 33 in combination with screws 34 engaged in the two other faces of the frame. Connections 35 passing through one of the faces of the frame enable the sequence conduits to be connected to the fluid input, whilst connections 36 passing through an adjoining face are connected to the exit orifices of the power conduits.

Figure 13:
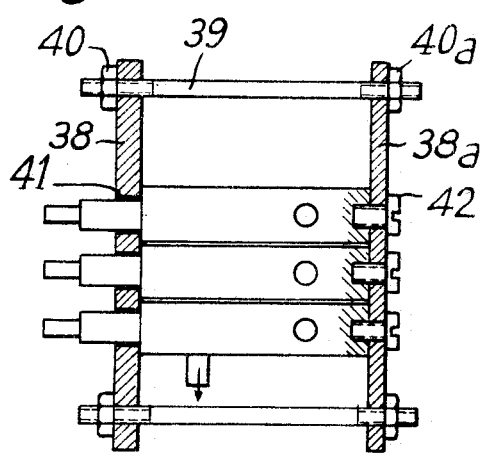
FIG. 13 is a view in transverse cross-section of another arrangement of cells.

In FIG. 13 the cells 37 are assembled between two parallel plates 38, 38a and connected by tie-rods 39 having nuts 40, 40a. The cells are engaged by their front portions in holes 41 formed in the plate 38 and are secured to the rear plate 38a by screws 42 the axes of which are perfectly aligned with the centerlines of the holes 41.

Figure 6:
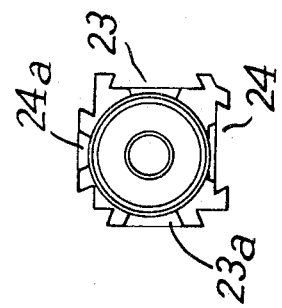
FIG. 6 is an end view of the same cell as that shown in FIG. 5.
Figure 5:
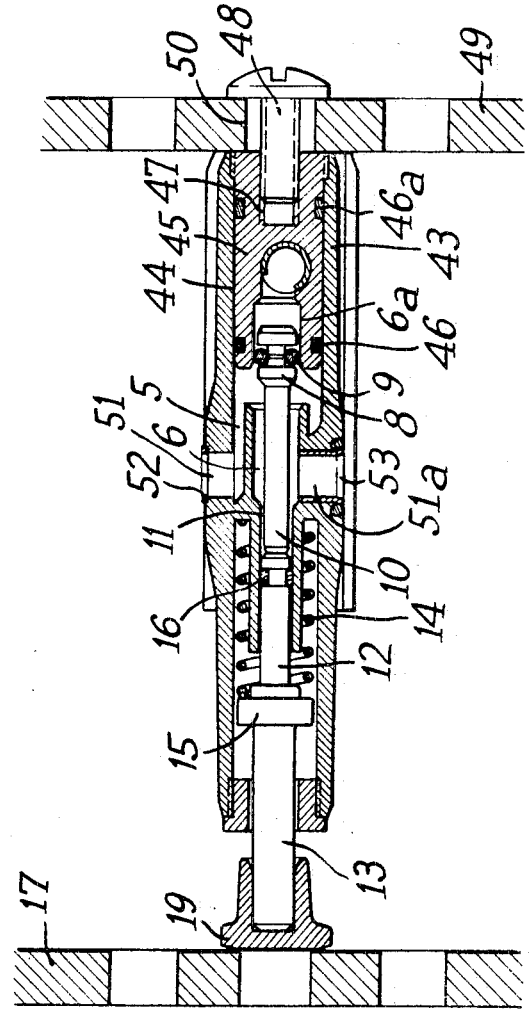
FIG. 5 is a view in longitudinal cross-section of an embodiment of a cell constituting the programming device.

There is shown in FIGS. 5 and 6 an embodiment of a cell which has, as previously described, ribs 23a, 24a and grooves 23, 14 of dove-tail section and which can be assembled as described with reference to FIG. 10 in order to form an assembly.

The body 43 of the cell is formed as shown in FIGS. 1 to 4 and has in its rear portion a bore 44 in which is engaged a sequence seat element 45 which is sealed within the bore by means of two toric seals 46, 46a. This seat element 45 has a threaded hole 47 in which is engaged a screw 48 for fixing the cell to a perforated plate 49.

Figure 14:
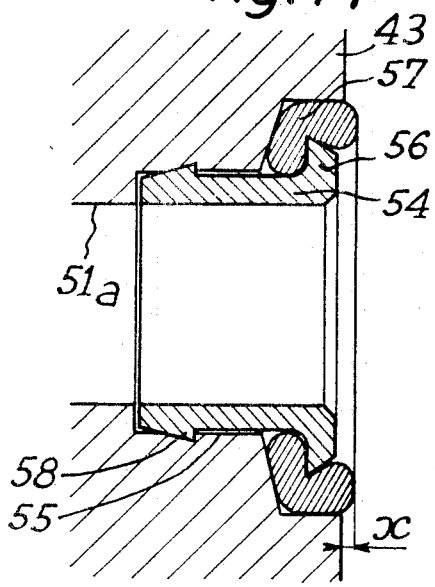
FIG. 14 is a view in cross-section of an arrangement of the joints disposed around the input and output orifices of the cells.

Portions of sequence conduits 51, 51a and power conduit 52 have a female side 53 containing a sealing device of an adjacent cell. The assembly of the joint on the female side on a portion of the conduit is shown in a larger scale in FIG. 14 and comprises a sleeve 54 which is forceably engaged in a housing 55 concentric with the conduit 51a where it compresses at its edge 56 a resilient toric ring 57 which when gripped extends to a predetermined height X from the face of the body 43. The sleeve 4 has a circular projection 58 with a cutting edge which is anchored in the material of the body 43 which is softer than that of the sleeve. The toric ring 57 is thus firmly fixed in the body and enables a good sealing to be obtained between surfaces sliding one over the other or simply applied against one another.

Figure 16:
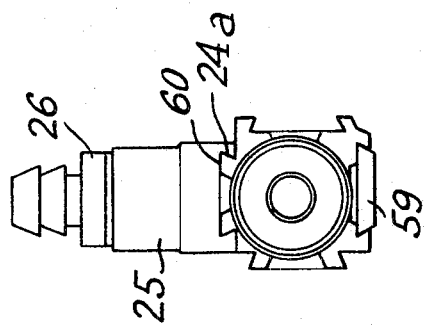
FIG. 16 is an end view of the cell shown in FIG. 15.
Figure 15:
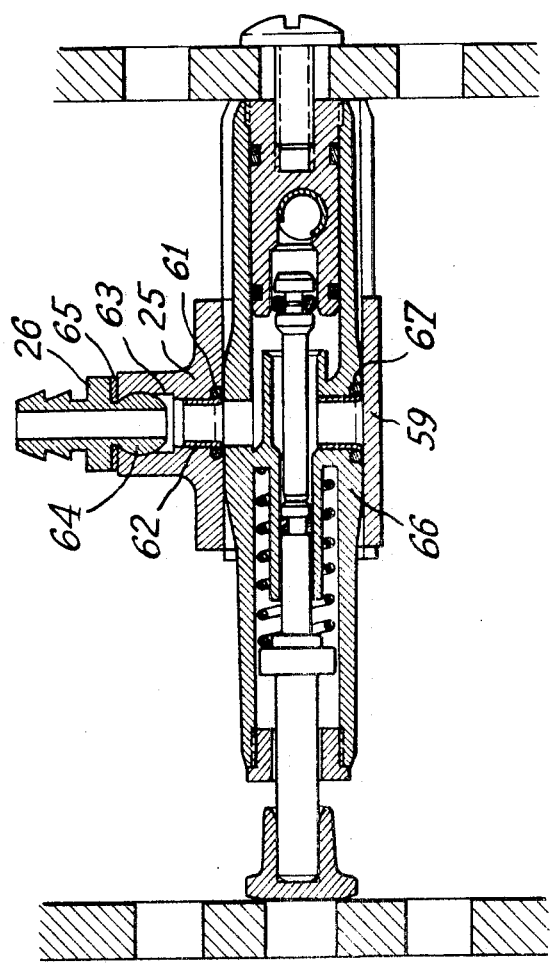
FIG. 15 is a view in longitudinal cross-section of a cell on which are mounted a connection and an obturation plate.

FIGS. 15 and 16 show a cell having a pressure take-off point 25 and a closure plate 59. The pressure point 25 has a groove 60 of dove-tail section whereby it is engaged on a rib 24a of the cell and a toric sealing ring 61 fixed by means of a sleeve 62 in the same way as described with reference to FIG. 14. A connection 26 is mounted on the pressure point 25 by means of a gasket 65 engaged in a bore 63 by means of a spherical portion 64. The cells 1a, 1b, 1c, 2c and 3c are provided at the side where the orifices lead into the grooves 23 with closure plates 59 of dove-tail section applied against a female side 66 provided with a sealing ring 67.

For greater simplicity the pressure take-off 25 and plate 59 are shown on a cell. It is clear that this is a special case and that for the general arrangement reference should be made to FIG. 10.

The programming device has been described above with a cell having an obturating pushrod, that is to say that the valve 8 prevents passage of fluid when the pushrod 12 is pushed in. FIG. 9 shows a cell which permits passage of fluid and in which passage of fluid from the sequence conduit to the power conduit is effected when the pushrod is pushed in. The cell comprises a body 68 having a sequence conduit portion 69 and a power conduit portion 70, a valve 71 constituted in the same way as the valve 8 and having a guide rod 72. The valve 71 is slidably mounted and can occupy two positions, one in which it is engaged in a cylindrical seat 73 of the inner bore in which it enables fluid to pass from the sequence conduit 69 towards the powed conduit 70, and the other in which the valve is engaged in a cylindrical seat 73a under the action of fluid coming from the conduit 70 and in which it prevents passage of fluid from the conduit 69 towards the conduit 70. A pushrod 74 which is pushed back towards the outside by the action of a spring 75 enables the valve 71 to be moved from the cylindrical part 73a where it blocks the passage towards the part 73 in order to allow communication between the conduits 69 and 70.

This type of cell enables individual manual testing of the different movements to be performed at each sequence. It avoids false manipulation, the pushrods which are not pushed in being in the blocking state, the programming plate being raised, all the circuits are closed.

Figure 17:
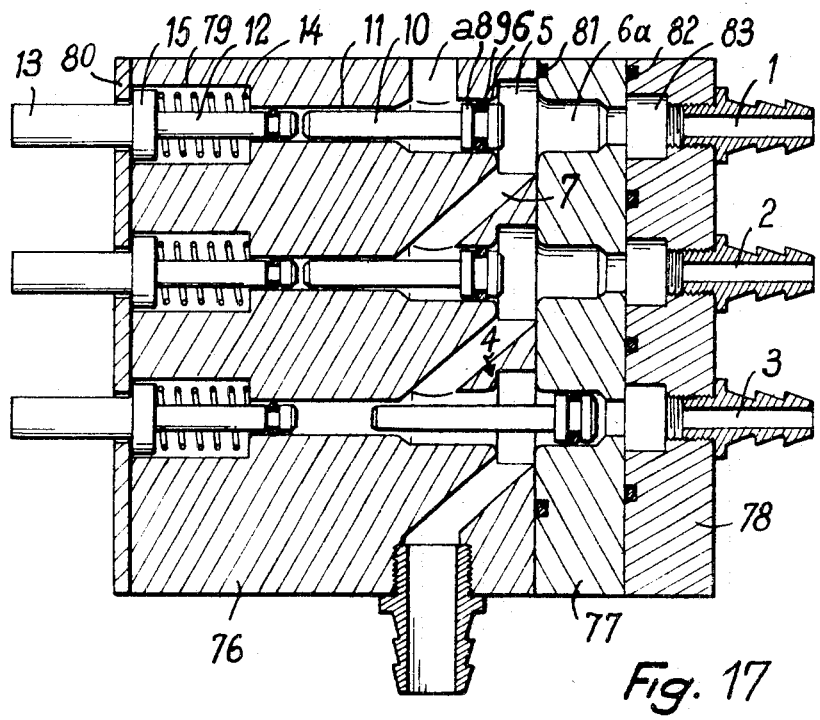
FIG. 17 is a view in cross-section of a programmer of which the panel is constituted by connected plates.

FIG. 17 shows a programmer in which the panel is constituted by a front plate or block 76, a middle plate 77 and a rear plate 78. The front plate 76 is apertured to form power conduits a and conduits 4 connecting the power conduits to the sequence conduits 1, 2, 3 each conduit 4 comprising a central chamber 5 and a cylindrical seat 6. The cylindrical seats 6a are formed in the middle plate 77 and the sequence inputs in the plate 78. The transfer ducts 7 connecting the central chamber 5 to the power conduit a are formed obliquely in the plate 76.

Valves 8 and pushrods 12, identical with those described above, are engaged in the openings 11 and 4 of the plate 76.

Chambers 79, in which are mounted springs 14, are provided in the plate 76 which receives on its front portion a plate 80 against which bear the abutments 15 of the pushrod 12. At the periphery of the plate 77 is provided a seal 81 ensuring sealing between the plates 76 and 77.

Sealing joint elements 82 are longitudinally disposed between the plates 77 and 78, which elements isolate from each other grooves 83 extending over the whole length of the plate 78 and each of which communicates with a sequence conduit 1, 2 or 3.

Figure 19:
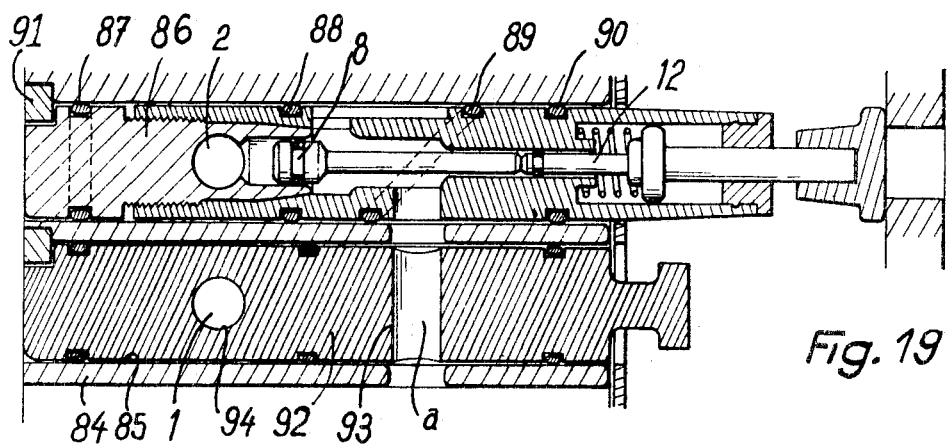
FIG. 19 is a view in cross-section of an embodiment of a panel having cavities containing programming elements.
Figure 18:
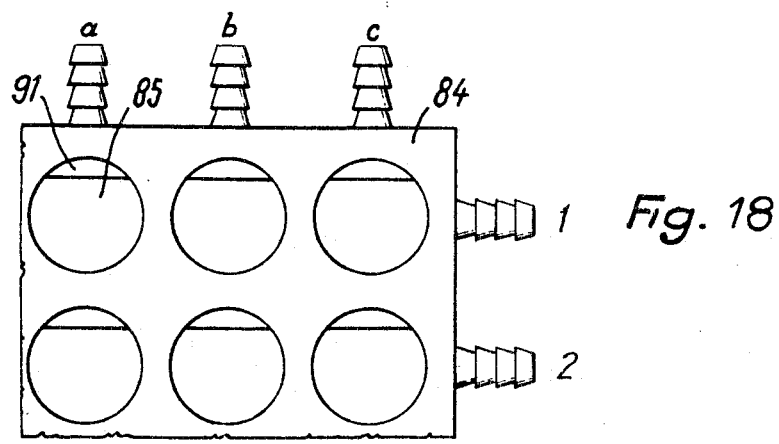
FIG. 18 is a front view of a programmer panel having cavities without elements.

FIGS. 18 and 19 show an alternative embodiment of programmer according to the invention which comprises a plate or block 84 in which are provided a series of separate bores 85 into which lead perpendicularly two distinct sets of sequence conduits 1 and 2 and power conduits a, b, c. These bores 85, which in the embodiment of FIG. 18, are of circular section, are adapted to receive programming elements 86, FIG. 19 equal in section to that of the bores 85 in which they are engaged. Sealing joints 87, 88, 89 and 90 are interposed to delimit the sequence and power systems the said programming elements being held against rotation by keys 91. The programming element 86 is formed in a manner identical to the cells described above and comprises a valve 8 and pushrod 12.

In certain bores which correspond to a part of the program which is not used, it is possible to employ filling elements 92 which have no valve and no pushrod and include a conduit portion 93 for the sequence conduit 1 and a conduit portion 94 for the power conduit a. These conduit portions 93 and 94 are isolated one from the other. The filling elements 92 enable a considerably reduced number of programming elements to be used which elements can be complicated in the case of a programmer used with a special machine of precise and determined function.

Figure 20:
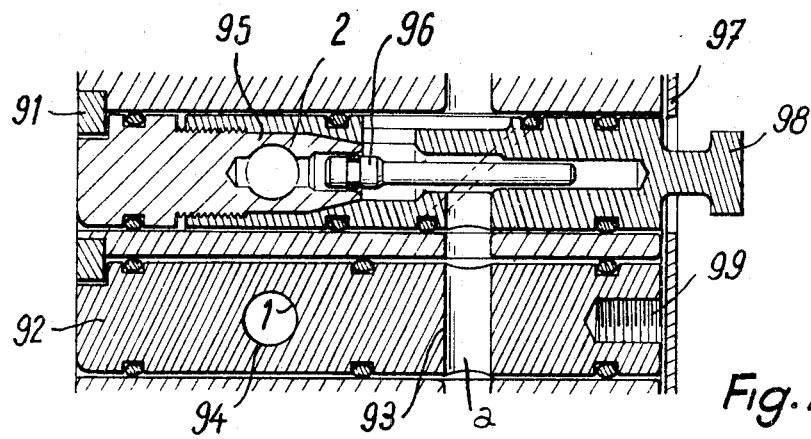
FIG. 20 is a view in cross-section of another embodiment of a panel having cavities containing programming elements.

In this case it is possible to replace the programming elements 86 which comprise blocking pushrods 12 by programming elements 95 (FIG. 20) which comprise the same internal connecting conduits with power and sequence lines as the elements 86 and only a free valve 96 which corresponds to the valve 8. This programming element 95 corresponds to an element 86 in a position in which it allows passage of fluid.

In this way, it is possible to use in combination programming elements 95 and filling elements 92. The bores 85 of the plate 84 of the programmer being all filled with filling elements 92, it is only necessary to withdraw a small number and replace them by cells 95 (FIG. 20) to establish a determined program.

To simplify the programming, it is possible to use a perforated card 97 at the places where the cells have to be provided with programming elements 95.

The programming elements 95 each have a button 98 extending outwardly of the card 97 for the introduction or extraction of the said element. For the same purpose, the filling elements 92 each have a blind threaded hole 99 in which can be screwed a threaded rod.

However, it is also possible to effect a program without a perforated card 97, the user placing programming cells 95 in the numbered bores according to a predetermined program.

Figure 21:
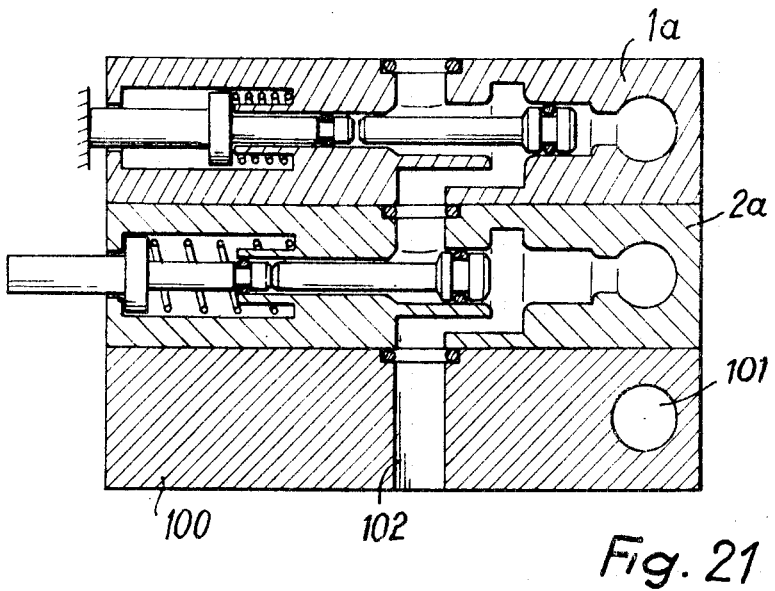
FIG. 21 is a view in cross-section of a programming device.

The FIG. 21 shows programming cells 1a, 2a identical to those described above which are used in combination with at least one filling cell 100 the exterior of which is shaped to be assembled with cells 1a, 2a. This cell 100 like the filling elements 92 has two conduit portions 101, 102 providing flow paths for the power and sequence lines respectively.

As in the previous examples, this enables a smaller number of programming cells 1a, 2a to be used in the case of a machine employing a predetermined work program.

Figure 23:
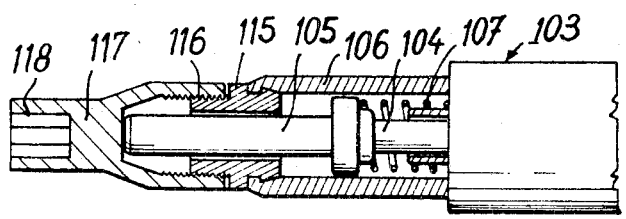
FIG. 23 is a view in cross-section of a programming cell furnished with another individual prevention means.
Figure 24:
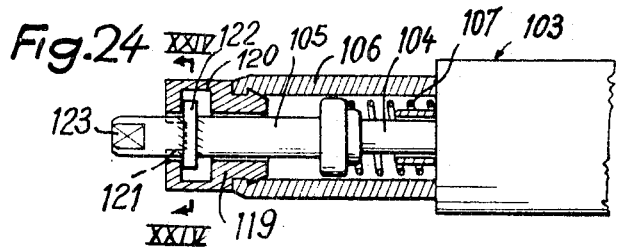
FIG. 24 is a view in cross-section of a programming cell furnished with a bayonet prevention means.

The programmer described above (FIG. 8) is used in combination with perforated cards applied against a supporting plate which is itself perforated, although it is possible to effect an individual program by operating each element. For this purpose there is shown in FIGS. 22, 23, 24 individual holding means enabling a pushrod to be maintained in the blocking or liberated position.

Figure 22:
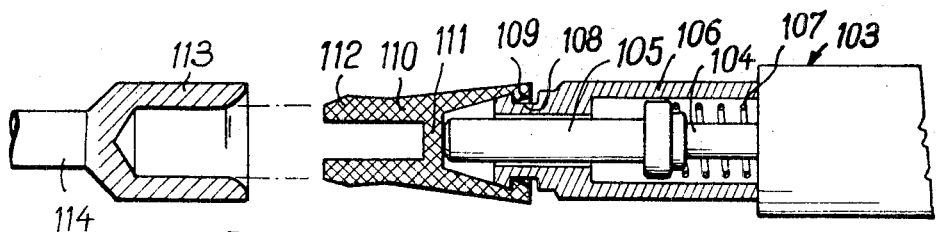
FIG. 22 is a view in cross-section of a programming cell furnished with an individual prevention means.

In FIG. 22 there is shown a programming cell 106 identical to that described (FIG. 5) which has a pushrod 104 subjected to the action of a spring 107, the end of the pushrod extends to the exterior of the body 106 of the cell.

At the end of the body 106, there is provided a groove 108 in which are engaged hooks or a ridge member 109 of a retaining element 110, the end of the pushrod 105 being in abutment against the bottom 111 of this retaining element 110, the pushrod being thus maintained in a blocking position.

The retaining element 110 is preferably of plastic material and has a gripping portion 112 adapted to engage in a housing 113 of a releasing element 114 which acts so as to separate the retaining element 110 from the body 106, thereby liberating the pushrod 105 which, under the action of spring 107 moves into its operative position.

In FIG. 23 there is shown a programming cell 103 identical with that described above and of which the body 106 receives a threaded insert 115. An end-piece 117 is adapted to be screwed onto the thread 116 of the insert 115 in order to maintain the end 105 of the pushrod 104 in a blocking position as indicated above.

The end-piece 117 includes a socket 118, preferably having six faces, in which a rod of corresponding form or a screwdriver can be engaged to unscrew the end-piece 117 and place the cell in its operative position as has been described above.

Figure 25:
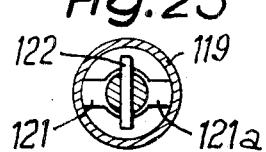
FIG. 25 is a view in cross-section along the line XXIV—XXIV of FIG. 24.

FIGS. 24 and 25 show another embodiment of an individual means for placing a cell 103 in its blocking position, which element is constituted by a bayonet device and has no moving parts.

On the end of the body 106 of the cell there is fixed an end-piece 119 having therein a circular chamber 120 and two longitudinal slots 121, 121a.

On the end 105 of the pushrod 104 is fixed a key 122 which is adapted to be engaged in or is engaged from the chamber 120 by the slots 121, 121a. The key 122, when engaged in the chamber 120, maintains the pushrod in blocking position against the action of a spring 107. The end 105 of the pushrod 104 has two flats 123 so that it may be manipulated with the aid of a key or similar tool. By rotating the pushrod 104, the key 122 is brought opposite the slots 121, 121a and under the action of the spring 107 the pushrod 104 is pushed back placing the cell in its operative position. The means described above and shown in FIGS. 22 to 25 enable tests to be made by trial and error to enable the programs to be properly adjusted. Since the cells are all in a blocking position to start with, the user, according to the cycle desired, organizes his first sequence according to the pressure lines chosen, after which he carries out the test of the second sequence and proceeds similarly for the other sequences. This method cannot be used with a perforated card which later must be completely formed before the test is carried out.

Not only is it possible to carry out a test sequence by sequence, but it is also possible to make a test of each movement. This method is very useful for studies and tests of movements on a pneumatic or fluidic simulator.

Figure 26:
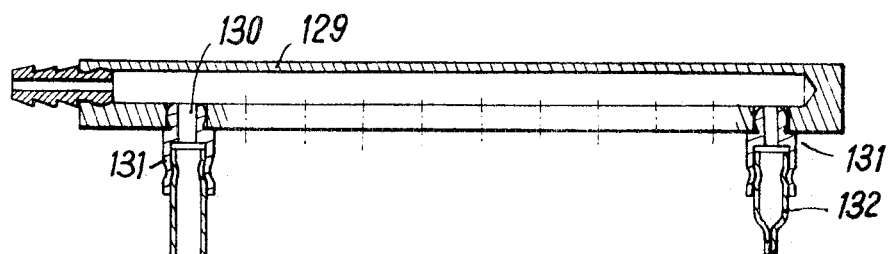
FIG. 26 is a view of a pneumatic cell passage control device.

In another embodiment shown in FIG. 26 a pneumatically controlled flow control device is used.

This device is used with cells 103 in which the end of the body 106 enclosing the pushrod 104 is slightly modified to provide therein a cylinder 124 in which is slidingly mounted a piston 125 rigid with the pushrod 104 and subjected to the action of a spring 126 which maintains the pushrod in its blocking position. The piston 125 has a seal 125a and contains therein a conduit 127 leading into one of the faces of the piston and adapted to be connected by a semi-rigid conduit 128 to a feed collector 129 of compressed fluid. The feed collector 129 has exits 130 provided with quick connections 131 in which are engaged the ends of the conduits 128 ending at the collector or may utilize a plug 132 which as shown is not connected.

The other end of the conduit 128 is connected to the piston 125 by a quick connection 133 which enables the conduit to be detached when the cell is in its blocking position and the spring 126 pushes back the piston and the pushrod.

When the conduit 128 is connected to the collector and to the piston 125 the fluid enters the chamber 134 by the conduit 127 and pushes the piston 125 back against the action of the spring 126 so that the cell is operative. It will be understood that the invention is not limited to the embodiments described and shown but covers all variations thereof without departing from the scope of the invention.

The device shown in FIG. 9 enables programming to be effected by means of perforated strips. This permits programming to be carried out program by program and the possibility of manually making the programs.

What is claimed is:

1. An integrated circuit fluid programmer for controlling the flow of pressurized fluid from sequence lines, fed chronologically in a predetermined order, to power lines, comprising an assembly block containing distinct series of sequence and power conduits having, respectively, sequence inputs and power outputs; orientation means for placing the sequence and power conduits in communication to enable fluid to flow from the sequence inputs towards the power outputs, and programming means for actuating certain of the orientation means, said assembly block comprising a plurality of cells, each orientation means comprising a valve member freely slidably mounted between two seats provided in each cell between the sequence and power conduits, said valve member being selectively fluid biased to a position where it places in communication, by means of a transfer duct, the sequence inputs and power outputs, said valve member being maintained on one of the two seats by a blocking member.

2. A programmer according to claim 1 characterized in that the valve member comprises a cylindrical piston provided at its central portion with a toric sealing joint which cooperates with said cylindrical seats, said piston being extended by a sliding rod guided in a bore in the cell.

3. A programmer according to claim 1 characterized in that the blocking member comprises a pushrod slidably mounted in a cell along the axis of the valve member, said pushrod being urged by a resilient element into a position in which the valve can move, having one end extending from the cell and adapted to come into contact with the programming means, the other end being in contact with a rod of the valve member and carrying a toric seal.

4. A programmer according to claim 3 characterized in that programming means comprises a perforated plate pivoted about an axis parallel to one edge of the assembly block and having holes arranged so that they are opposite the pushrods when the plate is moved against the panel, some of the pushrods having caps at their ends, the caps being disposed on the rods according to a predetermined program so that some of the rods are engaged under the action of the resilient elements in the holes of the plate for one position of operation of the cells, and those pushrods provided with caps are pushed back by the plate against the action of the resilient elements to place their associated cells in blocking condition.

5. A programmer according to claim 3 characterized in that the programming means comprises a pivoted perforated plate and that between the perforated plate and the ends of the pushrods is disposed a card having perforations located according to a predetermined program so that they are opposite the ends of some rods when the plate is brought against the assembly block and acts to operate other rods upon engagement by an unperforated portion of the card.

6. A programmer according to claim 5 characterized in that some of the perforations in the perforated plate are provided with plugs disposed according to a predetermined program.

7. A programmer according to claim 1 characterized in that each cell comprises a generally parallelepepedic element having assembly means on four lateral faces, said assembly means comprising interlocking slide means of dove-tail section, the slide means on opposite faces of each cell being respectively a rib and a groove.

8. A programmer according to claim 7 characterized in that the interlocking slide means are of rectangular section.

9. An integrated circuit fluid programmer for controlling the flow of pressurized fluid from sequence lines, fed chronologicaly in a predetermined order, to power lines, comprising an assembly block containing distinct series of sequence and power conduits having, respectively, sequence inputs and power outputs; orientation means for placing the sequence and power conduits in communication to enable fluid to flow from the sequence inputs to the power outputs, and programming means for actuating certain of the orientation means, said assembly block having therein bores defining a series of sequence and power conduits, said bores being provided with programming and filling elements which are engaged in the latter and prevented from turning by means of keys, sealing joints disposed between the programming and filling elements and the bore walls.

10. A programmer according to claim 9 characterized in that each programming element comprises a body portion having a section corresponding to that of the bore in which it is enclosed, the body portion having sequence and power conduits passing therethrough, orientation means comprising a valve member and a blocking member.

11. A programmer according to claim 10 characterized in that a retaining member is adapted to be mounted on the end of the body of each cell, said retaining member being adapted for engagement with the end of the pushrod and held in blocking position against the action of the resilient element acting on the pushrod.

12. A programmer according to claim 11 characterized in that the retaining member is of plastic material and has two hooks which are engaged in a groove provided on the cell body.

13. A programmer according to claim 11 characterized in that the retaining member comprises an end-piece in which is engaged the end of the pushrod and which is screwed on a threaded insert fixed to the cell body.

14. A programmer according to claim 10 characterized in that the end of each pushrod is provided with a key adapted to be engaged by two longitudinal grooves in a circular groove provided in an end-piece fixed to the cell body.

15. A programmer according to claim 10 characterized in that the cell body comprises a cylinder in which is slidably mounted a piston rigid with a pushrod, the piston being subjected on one of its faces to the action of a compressed fluid in opposition to a spring maintaining the pushrod in its blocking position.

16. A programmer according to claim 15 characterized in that there is formed within the piston a conduit leading to one of its faces and adapted to be connected to a fluid feed connector by means of a semi-rigid removable conduit.

17. A programmer according to claim 9 characterized in that each filling element comprises a body of section corresponding to that of one of the bores and having sequence and power conduits.

18. A programmer according to claim 9 characterized in that the programming element comprises a body confining orientation means for the circuits constituted by a valve member freely slidably mounted between two seats in the body between the conduit elements, the valve member being subjected to the action of a fluid and putting selectively in communication by means of a transfer duct the input of the sequence conduit element with the output of the power condition element.

19. A programmer according to claim 9 characterized in that the programming means is constituted by a perforated card having openings for the engagement of the programming cells in the bores.

References Cited

UNITED STATES PATENTS

| | | | |
|---|---|---|---|
| 2,751,933 | 6/1956 | Urteaga | 137—635 |
| 3,112,761 | 12/1963 | Swartz et al. | 137—635 XR |
| 3,147,769 | 9/1964 | Benton et al. | 137—635 XR |
| 3,237,529 | 3/1966 | Beck et al. | 137—624.18 XR |
| 2,247,141 | 6/1941 | Twyman | 137—271 XR |
| 2,784,738 | 3/1957 | Thurber | 251—367 XR |
| 2,834,368 | 5/1958 | Gray | 251—367 XR |
| 3,117,587 | 1/1964 | Willinger | 137—271 XR |
| 3,194,257 | 7/1965 | Stephens | 251—367 XR |
| 3,407,834 | 10/1968 | Brandenberg | 137—271 |

ROBERT G. NILSON, Primary Examiner

U.S. Cl. X.R.

137—271, 597; 251—367